(12) United States Patent
Kouchi et al.

(10) Patent No.: US 6,201,256 B1
(45) Date of Patent: Mar. 13, 2001

(54) CUTTING PLOTTER EQUIPPED WITH DEVICE FOR READING REGISTER MARKS FOR SEAL CUTTING AND METHOD FOR READING REGISTER MARKS USING SAME

(75) Inventors: Yuji Kouchi; Hisayuki Kobayashi, both of Nagano (JP)

(73) Assignee: Mimaki Engineering Co., Ltd., Nagano (JP)

( * ) Notice: Subject to any disclaimer, the term of this patent is extended or adjusted under 35 U.S.C. 154(b) by 0 days.

(21) Appl. No.: 09/008,760

(22) Filed: Jan. 19, 1998

(30) Foreign Application Priority Data

Oct. 7, 1997 (JP) .................................................. 9-291686

(51) Int. Cl.$^7$ ...................................................... G06K 9/00
(52) U.S. Cl. .................................... 250/559.44; 250/559.4
(58) Field of Search ............................. 250/548, 559.02, 250/559.29, 559.3, 559.36, 559.39, 559.4, 559.44; 356/399, 400, 401, 429, 430, 431, 372, 375

(56) References Cited

U.S. PATENT DOCUMENTS

| | | | |
|---|---|---|---|
| 3,658,430 | * | 4/1972 | Rashkin ................................ 356/400 |
| 3,787,702 | * | 1/1974 | Hujer et al. ...................... 250/559.44 |
| 4,142,105 | * | 2/1979 | Erdmann ............................... 250/548 |
| 4,864,631 | * | 9/1989 | Jensen .................................. 250/548 |
| 4,945,252 | * | 7/1990 | Lerner et al. ......................... 250/548 |
| 5,313,886 | * | 5/1994 | Müller .................................. 250/548 |
| 5,701,180 | * | 12/1997 | Saindon et al. ....................... 356/429 |
| 5,828,075 | * | 10/1998 | Siler et al. ....................... 250/559.44 |

* cited by examiner

Primary Examiner—John R. Lee
(74) Attorney, Agent, or Firm—Price and Gess

(57) ABSTRACT

A cutting plotter equipped with a device for reading register marks for seal cutting capable of accurately reading the register marks printed on a seal material. The cutting plotter includes a head provided thereon with a light emitting element for emitting a predetermined amount of light toward a surface of the seal material and a light receiving element for detecting the amount of light reflected from the surface of the seal material. A difference between the amounts of reflected light detected by the light receiving element is calculated by a first calculation unit and then stored in a storage unit. A relative difference between the difference in the amounts of reflected light stored in the storage unit and a difference between the amounts of reflected light calculated by the first calculation unit is calculated by a second calculation unit. Also, a determination unit is arranged so as to determine whether or not the relative difference calculated by the second calculation unit is within a predetermined tolerance, to thereby determine whether or not the register marks are printed on the seal material.

8 Claims, 5 Drawing Sheets

CUTTING PLOTTER EQUIPPED WITH DEVICE FOR READING REGISTER MARKS FOR SEAL CUTTING AND METHOD FOR READING REGISTER MARKS USING SAME

BACKGROUND OF THE INVENTION

1. Field of the Invention

This invention relates to a cutting plotter equipped with a device for reading register marks for seal cutting and a method for reading the register marks by means of the plotter, and more particularly to a cutting plotter including a device for reading register marks for seal cutting which are used for cutting stickers or seals printed on a seal material along respective contours thereof and a method for reading the register marks using the cutting plotter.

2. Description of Related Art

Now, the prior art will be described hereinafter with reference to FIG. 6. In FIG. 6, reference numeral 10 designates a seal material having a plurality of seals 20 printed thereon in a row. The seals 20 are each provided on a surface thereof with any desired characters, numerals, symbols, figures, pictures or the like. The seal material 10 is releasably adhered to a base sheet (not shown).

The seal material 10 also has register marks 30 for seal cutting printed on corners thereof. The register marks 30 each function as a reference for cutting the seals 20. The register marks 30 each have a lateral line and a longitudinal line defined parallel to a lateral axis x of the seal material 10 and a longitudinal axis y thereof, respectively. For example, the register mark 30 may be formed with a shape wherein the lateral and longitudinal lines intersect each other to define any suitable shape such as an L-like shape, a cross-like shape or the like. In FIG. 6, the lines define an L-like shape.

The seal material 10 is placed on a platen of a cutting plotter while being adhered to the base sheet. Then, a head of the cutting plotter is moved relative to the seal material 10 placed on the platen in X- and Y-directions, so that a cutter arranged on the head may cut each of the seals 20 printed on the seal material 10 along a contour 22 thereof, resulting in the seal 20 being separated from the seal material 10, followed by peeling off the seal 20 from the base sheet. Thereafter, the seal 20 is stuck onto a surface of any desired article by means of an adhesive applied to a rear surface thereof.

Thus, cutting of the seals 20 printed on the seal material 10 placed on the platen along the contours 22 by means of the cutting plotter is carried out by relatively moving the head of the cutting plotter in the X- and Y-directions above the seal material 10 placed on the platen on the basis of the register marks 30 printed on the corners of the seal material 10, to thereby cut each of the seals 20 along the contour 22 by means of the cutter mounted on the head.

Recently, in order to accomplish automated cutting of the seals printed on the seal material 10 along the contours 22 by the cutting plotter, it has been highly desired to develop a cutting plotter equipped with a unit for automatically reading the register marks 30 for seal cutting printed on the surface of the seal material 10.

For this purpose, a cutting plotter may be equipped with a register mark reading unit which is so constructed that a head is provided thereon with a light emitting element for emitting a predetermined amount of light toward the surface of the seal material 10 placed on a platen and a light receiving element for detecting an amount of light reflected from the surface of the seal material 10 placed on the platen when light is emitted from the light emitting element.

In such a cutting plotter, the head is relatively moved in X- and Y-directions above the seal material 10 placed on the platen to a position right above a portion of the seal material 10 on which the register mark 30 is supposed to be printed while emitting the predetermined amount of light toward the surface of the seal material 10 placed on the platen from the light emitting element arranged on the head. Then, the amount of reflected light which is emitted from the light emitting element and then reflected from the surface of the seal material 10 is detected by the light receiving element arranged on the head. Thus, whether or not each of the register marks 30 is actually printed on the portion of the surface of the seal material 10 on which the register mark 30 is supposed to be printed is automatically read on the basis of a difference between the amounts of reflected light detected by the light receiving element.

More specifically, the seal material 10 generally has a ground color such as white or the like sufficient to permit substantially all of light incident on the seal material to be reflected thereby. In contrast to this, the register marks 30 printed on the surface of the seal material 10 are colored black or the like, resulting in their absorbing most of light incident thereon without reflecting it. Thus, when the head is relatively moved from a position above a portion of the seal material 10 of which a ground color is exposed to a position right above the portion of the seal material on which a respective one of the register marks 30 is printed while emitting a predetermined amount of light toward the surface of the seal material 10 placed on the platen from the light emitting element, the amount of reflected light which is emitted from the light emitting element of the head, reflected from the surface of the seal material 10 and then received by the light receiving element is varied from about 100% to about 0% with movement of the head. This results in the register mark 30 which is actually printed on the portion of the seal material 10 on which it is supposed to be printed being read.

However, when the cutting plotter including such a register mark reading unit as described above is to read each of the register marks 30 which is actually printed on the portion of the seal material 10 on which it is supposed to be printed on the basis of the difference between the amounts of reflected light detected by the light receiving element, it encounters a critical problem. More particularly, when the difference between the amounts of reflected light detected by the light receiving element on the basis of which whether or not the register mark 30 is printed on the seal material is determined is set so as to have a small value, an unnecessary colored line printed such as in red, blue or the like on a surface of a portion of the seal material which is near the register mark 30 or a stain caused on the portion of the seal material is mistaken for the register mark 30 even when the amount of reflected light which is emitted from the light emitting element and reflected from a surface of the unnecessary colored line or stain is, for example, as small as 30%. This causes the head of the cutting plotter to be relatively moved in the X- and Y-directions above the platen on the basis of the unnecessary colored line or stain mistaken for the register mark 30, resulting in the cutter of the head failing to accurately cut each of the seals 20 along the contour 22.

Furthermore, the register marks 30 printed on the surface of the seal material 10 are inherently different in gloss, shade or the like from each other even when they are likewise colored black, so that the amounts of light reflected from the surfaces of the register marks 30 are not equally substantially 0% but different from each other. Likewise, the portions of the surface of the seal material 10 of which a ground color is exposed are different in gloss, dullness or the like from each other even when they are likewise colored white, so that the amounts of light reflected from the portions are not equally substantially 100%, thus, different from each other.

Therefore, when whether or not each of the register marks 30 is actually printed on the portion of the seal material 10 on which it is supposed to be printed is read on the basis of the difference between the amounts of reflected light detected by the light receiving element while the head is relatively moved in the X- and Y-directions above the seal material 10 placed on the platen to the position right above the portion of the seal material 10 on which the register mark 30 is supposed to be printed while emitting a predetermined amount of light toward the surface of the seal material 10 placed on the platen from the light emitting element arranged on the head, a significant problem occurs in the case that the difference between the amounts of reflected light detected by the light receiving element on the basis of which whether or not the register mark 30 is printed on the seal material is determined is set at a great value. More specifically, when the amount of light reflected from the surface of the register mark 30 is not substantially 0% but as great as, for example about 30% or the amount of light reflected from the surface of the portion of the seal material 10 near the register mark 30 is not substantially 100% but as small as, for example, about 70%, the cutting plotter equipped with the reading unit described above fails to read the register mark 30 which is actually printed on the surface of the portion of the seal material on which it is supposed to be printed.

SUMMARY OF THE INVENTION

The present invention has been made in view of the foregoing disadvantages of the prior art.

Accordingly, it is an object of the present invention to provide a cutting plotter equipped with a device for reading register marks for seal cutting which is capable of accurately reading register marks printed on a surface of a seal material without any mistake, even when any unnecessary colored line is printed on a surface of a portion of the seal material near the register mark or any stain is caused on the portion of the seal material, even when the amount of light reflected from a surface of each of the register marks is as great as about 30% due to dullness of the surface of the register mark, color fading of the register mark or the like, or even when the amount of light reflected from a portion of a surface of the seal material of which a ground color is exposed is as small as about 70% due to dullness of the portion, darkness of the portion or the like.

It is another object of the present invention to provide a method for reading register marks for seal cutting by means of the cutting plotter capable of attaining the above-described object.

In accordance with one aspect of the present invention, a cutting plotter including a device for reading register marks for seal cutting is provided. The cutting plotter includes a platen on which a seal material having register marks printed thereon is placed and a head arranged above the platen and mounted thereon with a cutter. The head is moved in X- and Y-directions relative to the seal material placed on the platen to permit the cutter to cut the seal material. The cutting plotter also includes a light emitting element arranged on the head so as to emit a predetermined amount of light toward a surface of the seal material placed on the platen, a light receiving element arranged on the head so as to detect an amount of light which is reflected from the surface of the seal material when the predetermined amount of light is emitted from the light emitting element, a first calculation means for calculating a difference between the amounts of reflected light detected by the light receiving element with respect to two portions of the seal material which are defined in proximity to each other, a storage means for storing therein the difference in the amounts of reflected light calculated by the first calculation means, a second calculation means for calculating a relative difference between the difference in the amounts of reflected light stored in the storage means and a second difference in the amounts of reflected light calculated by the first calculation means with respect to another two portions of the seal material, and a determination means for determining whether or not the relative difference calculated by the second calculation means is within a predetermined tolerance, to thereby determine whether or not the register marks are printed on the surface of the seal material.

In a preferred embodiment of the present invention, the cutting plotter further includes an A/D converter for converting the amount of reflected light detected by the light receiving element into a digital value, wherein the first calculation means calculates a digital value of the difference between the amounts of reflected light respectively detected by the light receiving element and converted into the digital value, the storage means stores therein the digital value of the difference in the amounts of reflected light calculated by the first calculation means, the second calculation means calculates a digital value of the relative difference between the difference in the amounts of reflected light stored in the storage means and the second difference in the amounts of reflected light calculated by the first calculation means, and the determination means determines whether or not the digital value of the relative difference calculated by the second calculation means is within a predetermined tolerance, to thereby determine whether or not the register marks are printed on the surface of the seal material.

In a preferred embodiment of the present invention, the cutting plotter further includes a moving means for moving the seal material in the Y-direction on the platen, wherein the head is moved in the X-direction.

In a preferred embodiment of the present invention, the moving means includes drive rollers and pinch rollers arranged in pairs on opposite sides of the platen in such a manner as to interposingly hold respective side ends of the seal material therebetween and each of the drive rollers is connected to a drive motor.

In a preferred embodiment of the present invention, the cutting plotter further includes a guide rail for supporting the head to guide the head in the X-direction.

In accordance with another aspect of the present invention, a method for reading register marks for seal cutting printed on a surface of a seal material is provided. The method includes the steps of: (a) moving a head in X- and Y-directions relative to the seal material placed on a platen to a position right above a first one of the register marks while emitting a predetermined amount of light toward the surface of the seal material from a light emitting element arranged on the head; (b) detecting, by a light receiving element arranged on the head, an amount of light which is reflected from a surface of the first register mark when light is emitted from the light emitting element and an amount of light which is reflected from a surface of a portion of the seal material, which portion is defined in proximity to the first register mark and of which portion a ground color is exposed, when light is emitted from the light emitting element during the moving of the head to the position right above the first register mark; (c) calculating a first difference between the amounts of reflected light detected by the light receiving element; (d) storing the first difference in the amounts of reflected light in a storage means; (e) moving the head in X- and Y-directions relative to the seal material to a position right above a portion of the seal material, on which a respective one of the remaining register marks is supposed to be printed, while emitting the predetermined amount of light toward the surface of the seal material from the light emitting element; (f) detecting, by the light receiving element, an amount of reflected light which is emitted from the light emitting element and reflected from the surface of the portion of the seal material on which the respective one of the remaining register marks is supposed to be printed and an amount of reflected light which is emitted from the light emitting element and reflected from a surface of a portion of the seal material, which portion is defined in proximity to the portion of the seal material on which the respective one of the remaining register marks is supposed to be printed and of which portion a ground color is exposed, during the moving of the head to the position right above the portion of the seal material on which the respective one of the remaining register marks is supposed to be printed; (g) calculating a second difference between the amounts of reflected light respectively detected by the light receiving element in the step (f); (h) calculating a relative difference between the first difference in the amounts of reflected light stored in the storage means and the second difference in the amounts of reflected light calculated in the step (g); and (i) determining whether or not the relative difference is within a predetermined tolerance, to thereby determine whether or not the register mark is printed on the surface of the portion of the seal material on which the respective one of the remaining register marks is supposed to be printed.

In a preferred embodiment of the present invention, the method further includes the step of converting the amount of reflected light detected by the light receiving element into a digital value, wherein the calculating of the first difference includes calculating a digital value of the first difference between the amounts of reflected light respectively detected by the light receiving element, the storing of the first difference includes storing the digital value of the first difference in the storage means, the calculating of the second difference includes calculating a digital value of the second difference between the amounts of reflected light respectively detected by the light receiving element, the calculating of the relative difference includes calculating a digital value of the relative difference between the first and second differences, and the determining includes determining whether or not the digital value of the relative difference is within a predetermined tolerance, to thereby determine whether or not the register marks are printed on the surface of the seal material.

In a preferred embodiment of the present invention, the moving of the head relative to the seal material includes moving the head in the X-direction above the seal material and moving the seal material in the Y-direction on the platen.

In the cutting plotter and the method of the present invention thus constructed, the head is relatively moved above the platen in the X- and Y-directions to the position right above a first one of the register marks printed on the surface of the seal material while emitting the predetermined amount of light toward the surface of the seal material from the light emitting element arranged on the head. The amount of light reflected from the surface of the first register mark and the amount of light reflected from the surface of the portion of the seal material, which portion is defined in proximity to the first register mark and of which portion a ground color is exposed, are detected by the light receiving element arranged on the head. A difference between the amounts of reflected light thus detected by the light receiving element is calculated by the first calculation means and then stored in the storage means. Thus, the steps (a) to (d) of the method of the present invention are carried out.

Then, the head is moved in the X- and Y-directions relative to the seal material to the position right above the portion of the seal material on which a respective one of the remaining register marks is supposed to be printed while emitting the predetermined amount of light toward the surface of the seal material from the light emitting element. That is, the step (e) of the method is conducted.

At this time, the amount of reflected light which is emitted from the light emitting element and reflected from the surface of the portion of the seal material on which the respective one of the remaining register marks is supposed to be printed and the amount of reflected light which is emitted from the light emitting element and reflected from the surface of the portion of the seal material, which portion is positioned in proximity to the portion of the seal material on which the respective one of the remaining register marks is supposed to be printed and of which portion a ground color is exposed, are detected by the light receiving element during the moving of the head to the position right above the portion of the seal material on which the respective one of the remaining register marks is supposed to be printed. Then, the first calculation means calculates a second difference between the amounts of reflected light thus detected by the light receiving element. Thus, the steps (f) and (g) of the method are carried out.

Then, the second calculation means calculates a relative difference between the difference in the amounts of reflected light stored in the storage means and the second difference in the amounts of reflected light calculated by the first calculation means. Subsequently, the determination means determines whether or not the relative difference thus calculated by the second calculation means is within the predetermined tolerance, to thereby determine whether or not each of the remaining register marks is printed on the surface of the portion of the seal material on which it is supposed to be printed. Thus, the steps (h) and (i) of the method are conducted.

Now, the reason why such accurate determination is accomplished will be described hereinafter.

The first register mark and subsequent register marks printed on the same seal material and with the same printing pigment under the same conditions, so that the amount of light reflected from the surface of each of the first and subsequent register marks is rendered substantially constant such as, for example, at 0% or the like. Likewise, the amount of light reflected from the portion of the seal material, which is positioned in proximity to the respective one of the first and subsequent register marks and of which a ground color is exposed, is rendered substantially constant such as, for example, at 100% or the like. Thus, the difference between the amount of light reflected from the surface of each of the first and subsequent register marks and the amount of light reflected from the portion of the seal material, which is near the respective one of the register marks and of which the ground color is exposed, is rendered substantially constant.

In contrast to this, when, for example, an unnecessary colored line is printed on a surface of a portion of the seal material near one of the second and subsequent register marks or a stain is caused on the surface of the portion of the seal material, the amount of light reflected from a surface of the colored line or that of the stain is, for example, as small as 30% or the like, so that a difference between the amount of light reflected from the surface of the colored line or that of the stain and the amount of light reflected from a surface of a portion of the seal material, which is defined near the colored line or stain and of which a ground color is exposed, is greater or smaller than the difference in the amounts of reflected light stored in the storage means. This causes a relative difference between the difference in the amounts of reflected light stored in the storage means and the difference in the amounts of reflected light which is calculated by the second calculation means to be outside the predetermined tolerance. This results in the fact that the colored line or stain is not the register mark printed on the seal material being correctly judged by the determination means. Thus, this prevents the colored line or stain from being mistaken for one of the second and subsequent register marks printed on the surface of the seal material.

Further, even when any situation, such as lack of gloss of the surface of the register mark printed on the seal material, color fading of the register mark or the like, causes the amount of light reflected from the surface of the register mark to be increased to a level as high as 30%, or even when any situation, such as lack of gloss of the portion of the seal material which is positioned near the register mark and of which a ground color is exposed, dullness of the portion or the like, causes the amount of light reflected from the portion of the seal material to be decreased to a level as low as 70%, the difference between the amount of light reflected from the surface of each of the second and subsequent register marks and the amount of light reflected from the portion of the seal material, which is near the respective one of the register marks and of which a ground color is exposed, is permitted to be substantially identical with the difference in the amounts of reflected light stored in the storage means and obtained from the amount of light reflected from the surface of the first register mark formed of the same printing pigment under the same conditions as the second and subsequent register marks and the amount of light reflected from the portion of the seal material which is near the first register mark and of which a ground color is exposed. This results in the relative difference between the difference in the amounts of reflected light stored in the storage means and the difference in the amounts of reflected light between the amount of light reflected from the surface of each of the second and subsequent register marks and the amount of light reflected from the portion of the seal material, which is near the respective one of the register marks and of which a ground color is exposed, being permitted to be within the predetermined tolerance, when the relative difference is calculated by the second calculation means. This permits the determination means to accurately determine that the second and subsequent register marks are actually printed on the portions of the seal material on which they are supposed to be printed. As a result, the second and subsequent register marks can be accurately read without any mistake.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, the present invention will be described hereinafter with reference to the accompanying drawings.

Figure 1:
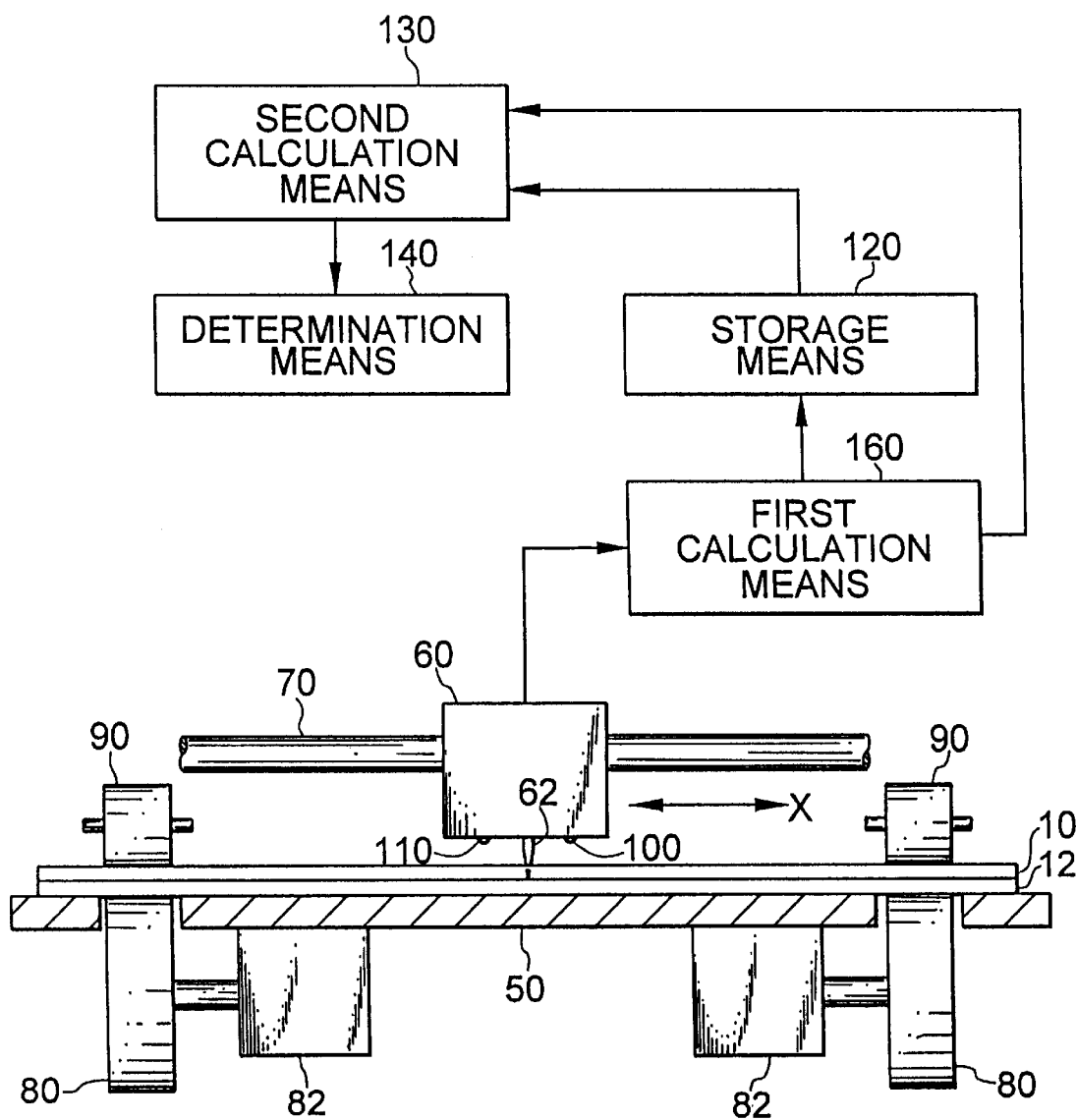
FIG. 1 is a schematic view showing an embodiment of a cutting plotter according to the present invention.
Figure 2:
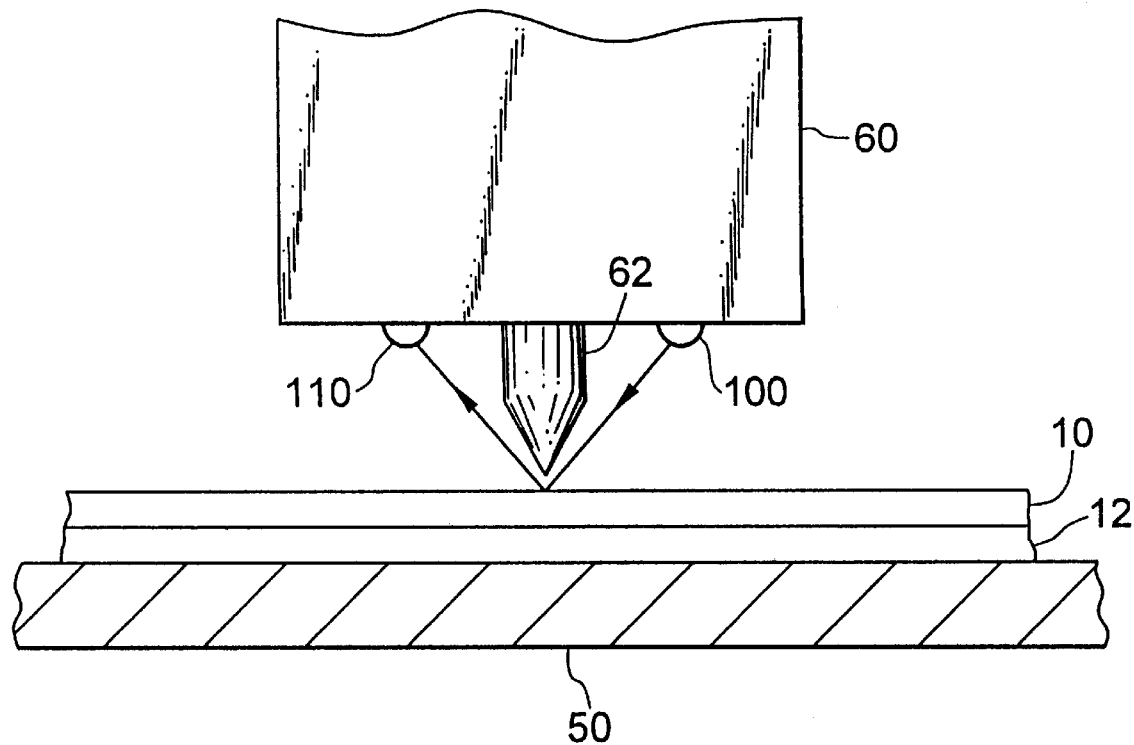
FIG. 2 is a schematic fragmentary enlarged view showing a head of the cutting plotter of FIG. 1 and a periphery thereof.

Referring first to FIGS. 1 and 2, an embodiment of a cutting plotter according to the present invention is illustrated. In FIGS. 1 and 2, reference numeral 50 designates a platen on which a seal material 10 is placed. The platen 50 has an upper surface finished smoothly to permit the seal material 10 to be smoothly slidable thereon. A head 60 is supported above the platen 50 through a guide rail 70 in a manner to be movable in an X-direction. The head 60 is mounted thereon with a cutter 62 in a manner to face a cutting edge thereof toward the platen 50.

The platen 50 is provided on opposite sides thereof with pinch rollers 90 and feed rollers 80 arranged in pairs in a manner to be vertically opposite to each other with the platen 50 being interposed therebetween. In the illustrated embodiment, the feed rollers 80 are arranged below the platen 50 and therefore the pinch rollers 90 are arranged above the platen 50. The feed rollers 80 are each connected to a drive means 82 for driving the feed roller 80, which may be a pulse motor or the like. The pinch rollers 90 are rotatably supported above the platen 50.

The cutting plotter of the illustrated embodiment thus constructed is adapted to permit the seal material 10 adhered to a base sheet 12 to be placed on the platen 50 together with the base sheet 12. Also, the feed rollers 80 and pinch rollers 90 cooperate with each other to interposingly hold the opposite sides of the seal material 10 together with the base sheet 12 therebetween. The feed rollers 80 are rotated in both directions by the drive means 82, to thereby transfer the seal material 10 together with the base sheet 12 in a Y-direction on the platen 50. Also, the cutting plotter is constructed so as to permit the head 60 to be moved in the X-direction along the guide rail 70 above the platen 50. Thus, the head 60 is permitted to be moved in both X- and Y-directions above the seal material 10 arranged on the platen 50 relative to the seal material 10. The seal material 10 placed on the platen 50 is cut by the cutter 62 mounted on the head 60.

The above-described construction of the cutting plotter of the illustrated embodiment is substantially the same as a conventional cutting plotter of the paper moving type. However, the cutting plotter of the illustrated embodiment, as shown in FIG. 2, further includes a light emitting element 100 for emitting a predetermined amount of light toward a surface of the seal material 10 placed on the platen 50 and a light receiving element 110 for detecting the amount of light which is reflected from the surface of the seal material 10 when the predetermined amount of light is emitted from the light emitting element 100. In the illustrated embodiment, both light emitting element 100 and light receiving element 110 are arranged on the head 60.

In addition, the cutting plotter of the illustrated embodiment includes a first calculation means 160 for calculating a difference between the amounts of reflected light which are detected by the light receiving element 110 with respect to two portions of the seal material 10 which are defined in proximity to each other. The first calculation means 160 consists of an electronic circuit or the like.

Also, the cutting plotter includes a storage means 120 for storing therein the difference between the amounts of reflected light which is calculated by the first calculation means 160. The storage means 120 may be constituted by an electronic memory circuit or the like.

Further, the cutting plotter includes a second calculation means 130 for calculating a relative difference between the difference in the amounts of reflected light stored in the storage means 120 and a second difference between the amounts of reflected light calculated by the first calculation means 160 with respect to another two portions of the seal material 10. The second calculation means 130 may consist of an electronic circuit or the like.

Furthermore, the cutting plotter of the illustrated embodiment includes a determination means 140 for determining whether or not the relative difference between the differences in the amounts of reflected light which is calculated by the second calculation means 130 is within a predetermined tolerance, to thereby determine whether or not register marks 30 for seal cutting are printed on the surface of the seal material 10. The determination means 140 may be constituted by an electronic comparator circuit or the like.

Now, reading of the register marks 30 for seal cutting by means of the cutting plotter of the illustrated embodiment thus constructed will be described hereinafter.

As shown in FIG. 1, the seal material 10 adhered to the base sheet 12 is placed on the platen 50 together with the base sheet 12. Then, the seal material 10 is interposedly held at both side ends thereof between the feed rollers 80 and the pinch rollers 90 together with the base sheet 12. Then, the feed rollers 80 are rotated through the drive means 82 so that the seal material 10 may be moved in the Y-direction on the platen 50 while a predetermined amount of light is emitted from the light emitting element 100 arranged on the head 60 toward the surface of the seal material 10 placed on the platen 50. Concurrently, the head 60 is moved in the X-direction along the guide rail 70. This results in the head 60 being moved in the X- and Y-directions relative to the seal material 10 placed on the platen 50 to a position right above a first one of the register marks 30 for seal cutting printed on the seal material 10 and more specifically, for example, to a position right above the lower—right register mark 30 in FIG. 6.

During such relative movement of the head 60, light is emitted from the light emitting element 100 arranged on the head 60 toward the surface of the seal material 10. The amount of light reflected from a surface of the first register mark 30 printed on the surface of the seal material 10 and the amount of light reflected from a surface of a portion of the seal material 10, which is near the first register mark 30 and of which a ground color is exposed, are detected by the light receiving element 110 arranged on the head 60. Then, a difference AO between the amounts of reflected light which are detected by the light receiving element 110 is calculated by the first calculation means 160. The difference AO thus calculated is then stored in the storage means 120.

Figure 6:
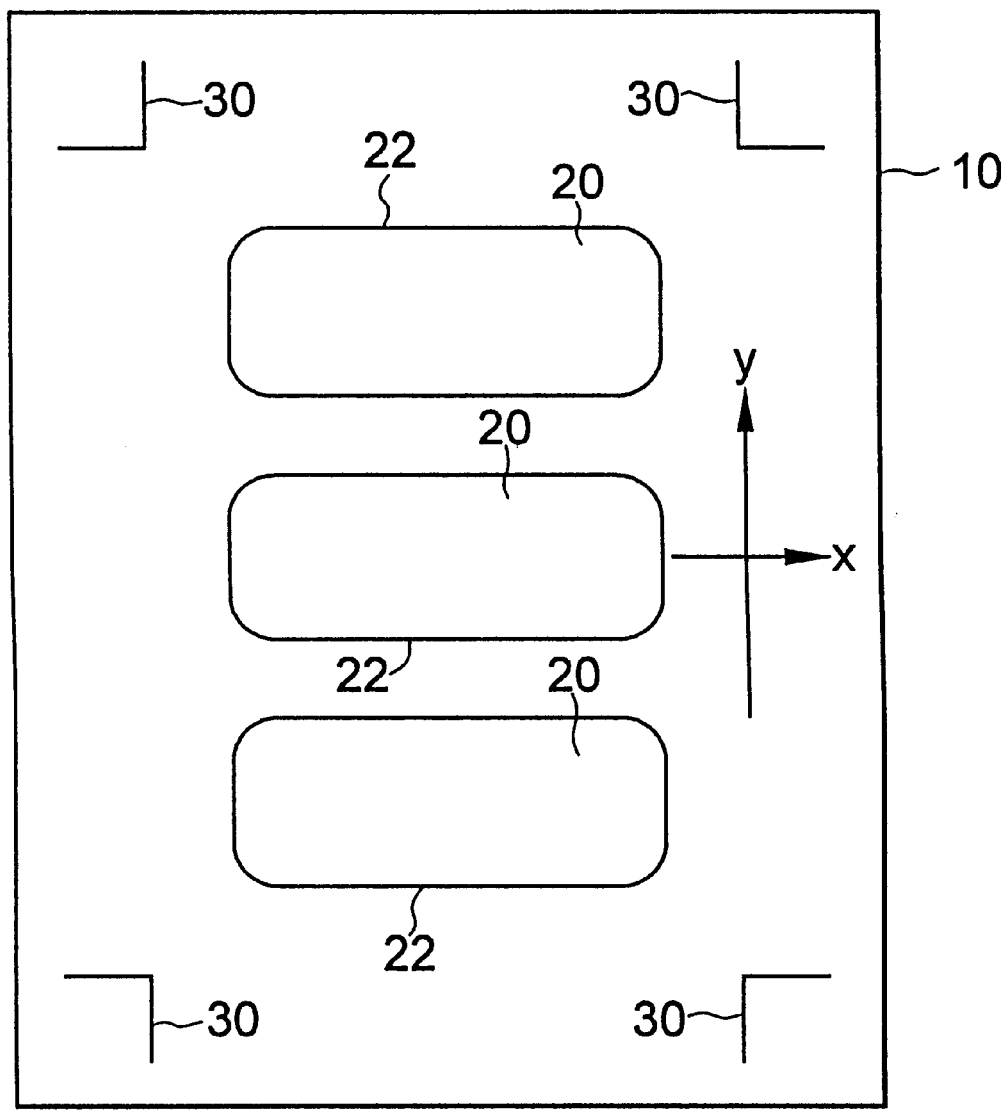
FIG. 6 is a plan view showing a seal material.

Subsequently, while light is emitted from the light emitting element 100 arranged on the head 60 toward the surface of the seal material 10, the head 60 is likewise moved in the X- and Y-directions above the platen 50 relative to the seal material 10 placed on the platen 50 to a position right above a portion of the seal material 10 on which a respective one of the remaining or second and subsequent register marks 30 is supposed to be printed and more specifically, for example, to a position right above the upper-right register mark 30, the lower-left register mark 30 or the like in FIG. 6.

During such relative movement of the head 60, light is emitted from the light emitting element 100 arranged on the head 60 toward the surface of the seal material 10, so that the amount of light reflected from the surface of the portion of the seal material 10 on which the respective one of the remaining register marks 30 is supposed to be printed and the amount of light reflected from a surface of a portion of the seal material 10, which portion is in proximity to the portion of the seal material 10 on which the respective one of the remaining register marks 30 is supposed to be printed and of which portion a ground color is exposed, are detected by the light receiving element 110 arranged on the head 60. Then, a difference A between the amounts of reflected light which are detected by the light receiving element 110 is calculated by the first calculation means 160.

Then, a relative difference between the difference AO in the amounts of reflected light stored in the storage means 120 and the difference A in the amounts of reflected light calculated by the first calculation means 160 is calculated by the second calculation means 130. Thereafter, the determination means 140 determines whether or not the relative difference calculated by the second calculation means 130 is within a predetermined tolerance, so that whether or not each of the remaining register marks 30 is actually printed on the portion of the seal material 10 on which it is supposed to be printed is judged or determined.

Reading of the register marks 30 by the present invention carried out as described above permits the register marks 30 printed on the surface of the seal material 10 to be accurately read even if any unnecessary colored line is printed on a portion of the seal material 10 near a respective one of the register marks 30 or any stain is caused on the portion of the seal material, or even if any situation, such as lack of gloss of surfaces of the register marks 30, color fading of the register marks 30 or the like, causes the amount of light reflected from the surface of each of the register marks 30 to be increased to a level as high as 30%. Also, reading of the register marks 30 by the present invention ensures accurate reading of the register marks 30 even if any situation, such as lack of gloss of a portion of the seal material 10 which is near a respective one of the register marks 30 and of which a ground color is exposed, dullness of the portion of the seal material 10 or the like, causes the amount of light reflected from the portion of the seal material 10 to be decreased to a level as low as 70%.

Figure 3:
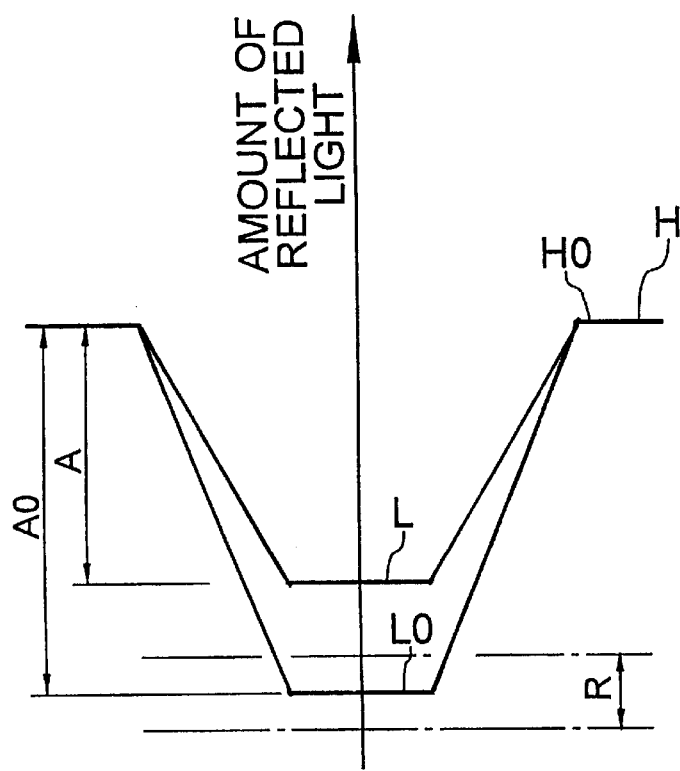
FIG. 3 is a diagrammatic view showing a stage of reading of a register mark in the present invention.

Now, the reason why such accurate reading is attained will be detailedly described hereinafter. The first register mark 30 and subsequent register marks 30 are printed on the same seal material 10 and with the same printing pigment under the same conditions, so that the amount LO of light reflected from the surface of each of the first and subsequent register marks 30 is rendered substantially constant such as, for example, at 0% or the like. Likewise, the amount HO of light reflected from the portion of the seal material 30 which is positioned in proximity to the respective one of the first and subsequent register marks 30 and of which a ground color is exposed is rendered substantially constant such as, for example, at 100% or the like. Thus, the difference AO between the amount LO of light reflected from the surface of each of the first and subsequent register marks 30 and the amount HO of light reflected from the portion of the seal material 10 which is near the respective one of the register marks 30 and of which a ground color is exposed is rendered substantially constant as shown in FIG. 3. In FIG. 3, LO designates the amount of light reflected from the surface of each of the first and subsequent register marks 30, HO is the amount of light reflected from the surface of the portion of the seal material 10 which is defined in proximity to the respective one of the first and subsequent register marks 30 and of which a ground color is exposed, and AO is the above-described difference between the amounts HO and LO.

On the other hand, when, for example, an unnecessary colored line is printed on a surface of a portion of the seal material 10 near one of the remaining or second and subsequent register marks 30 or a stain is caused on the surface of the portion of the seal material 10, the amount L of light reflected from a surface of the colored line or that of the stain is, for example, 30% or the like, so that a difference A between the amount L of light reflected from the surface of the colored line or that of the stain and the amount H of light reflected from a surface of a portion of the seal material 10 which is defined near the colored line or stain and of which a ground color is exposed is greater or smaller than the difference AO in the amounts of the reflected light stored in the storage means 120, as shown in FIG. 3. Normally, the difference A is smaller than the difference AO as shown in FIG. 3. This causes a relative difference between the difference AO in the amounts of reflected light stored in the storage means 120 and the difference A in the amounts of reflected light which is calculated by the second calculation means 130 to be outside a predetermined tolerance R. This results in the fact that the colored line or stain is not the register mark 30 printed on the seal material 10 being correctly judged by the determination means 140, to thereby prevent the colored line or stain from being mistaken for one of the remaining or second and subsequent register marks 30 printed on the surface of the seal material 10. In FIG. 3, L designates the amount of light reflected from the surface of the colored line or stain, H is the amount of light reflected from the surface of the portion of the seal material 10 which is defined near the colored line or stain and of which a ground color is exposed, A is the difference between the amounts H and L of reflected light, and R is a range of the tolerance of the relative difference between the differences AO and A in the amounts of reflected light.

Figure 4:
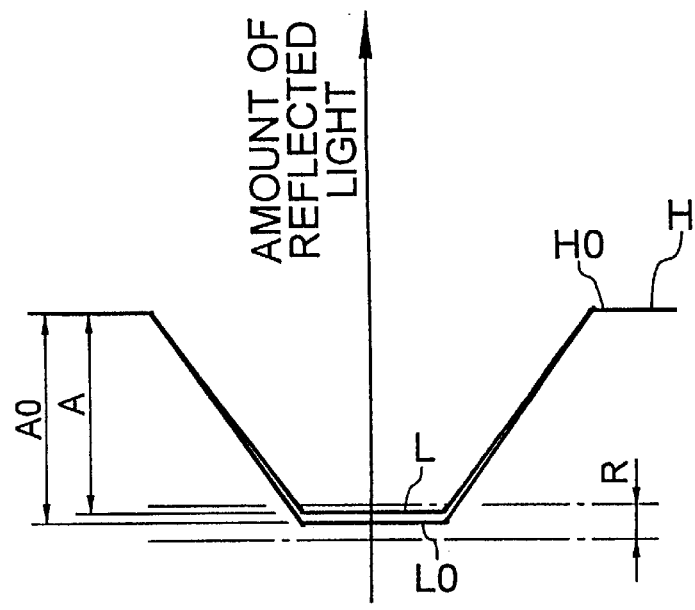
FIG. 4 is a diagrammatic view showing another stage of reading of a register mark in the present invention.

Further, even when any situation, such as lack of gloss of the surface of each of the register marks 30 printed on the seal material 10, color fading of each of the register marks 30 or the like, causes the amount of light reflected from the surface of the register mark 30 to be increased to a level as high as 30%, or even when any situation, such as lack of gloss of the portion of the seal material 10 which is positioned near the register mark 30 and of which a ground color is exposed, dullness of the portion of the seal material 10 or the like, causes the amount of light reflected from the portion of the seal material 10 to be decreased to a level as low as 70%, the difference A between the amount L of light reflected from the surface of each of the second and subsequent register marks 30 and the amount H of light reflected from the portion of the seal material 10 which is near the respective one of the register marks 30 and of which a ground color is exposed, as shown in FIG. 4, is permitted to be substantially identical with the difference AO in the amounts of reflected light stored in the storage means 120 and obtained from the amount of light reflected from the surface of the first register mark 30 formed of the same printing pigment under the same conditions as the second and subsequent register marks 30 and the amount of light reflected from the portion of the seal material 10 which is near the first register mark 30 and of which a ground color is exposed. This results in the relative difference between the difference AO in the amounts of reflected light stored in the storage means 120 and the difference A between the amount L of light reflected from the surface of each of the second and subsequent register marks 30 and the amount H of light reflected from the portion of the seal material 10 which is near the respective one of the register marks 30 and of which a ground color is exposed being permitted to be within the predetermined tolerance R, when the relative difference is calculated by the second calculation means 130. This permits the determination means 140 to accurately determine whether or not the second and subsequent register marks 30 are actually printed on the portions of the seal material 10 on which they are supposed to be printed. In FIG. 4, LO designates the amount of light reflected from the first register mark 30, HO is the amount of light reflected from the surface of the portion of the seal material 10 which is defined in proximity to the first register mark 30 and of which a ground color is exposed, and AO is the difference between the amounts HO and LO. L designates the amount of light reflected from the surface of each of the second and subsequent register marks 30, H is the amount of light reflected from the surface of the portion of the seal material 10 which is defined near the respective one of the second and subsequent register marks 30 and of which a ground color is exposed, A is the difference between the amounts H and L of reflected light, and R is a range of the tolerance of the relative difference between the differences AO and A in the amounts of reflected light which is calculated by the second calculation means 130.

Figure 5:
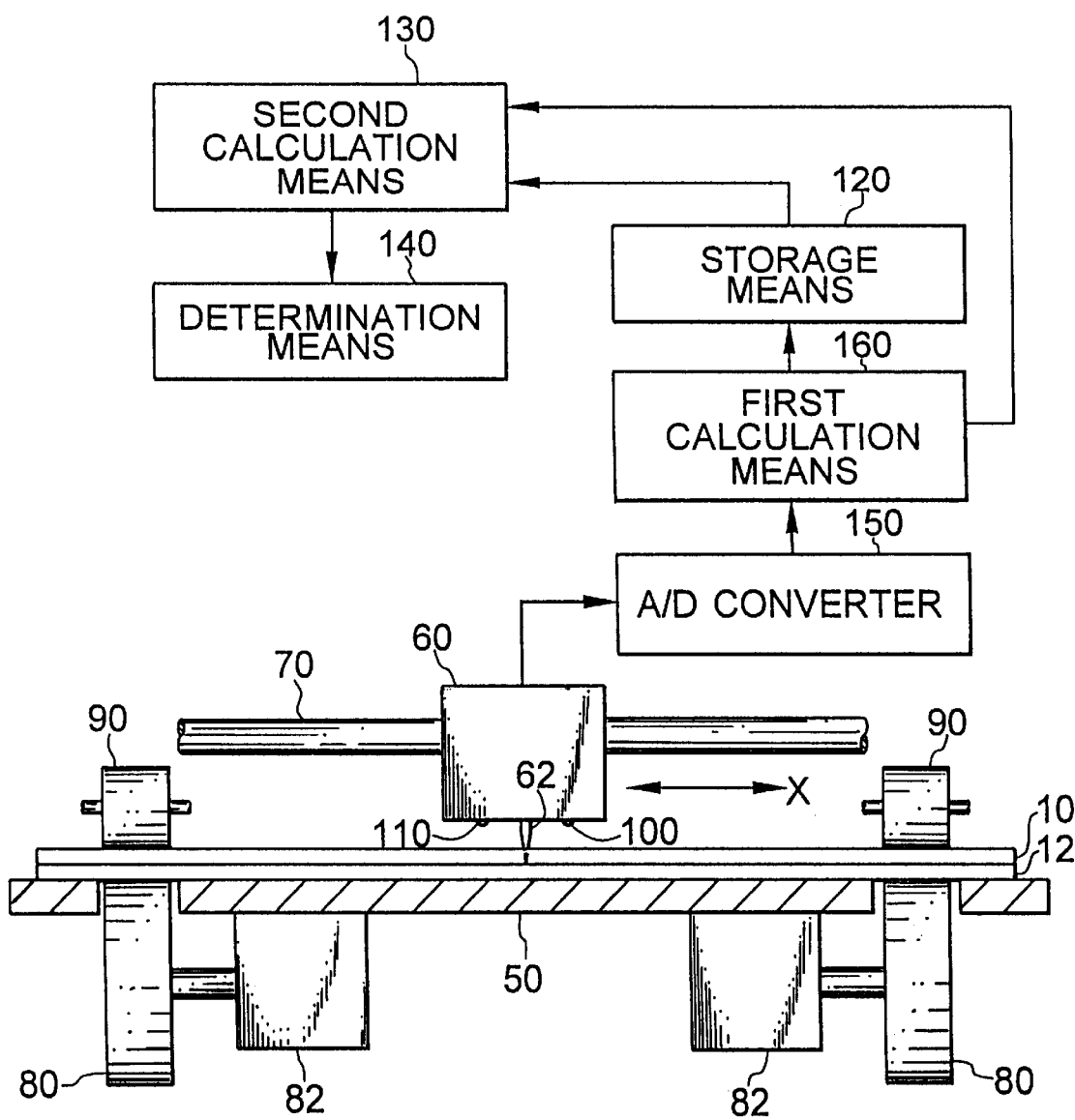
FIG. 5 is a block diagram showing another embodiment of a cutting plotter according to the present invention.

Referring now to FIG. 5, another embodiment of a cutting plotter according to the present invention is illustrated. A cutting plotter of the illustrated embodiment desirably includes an A/D converter 150 for converting the amount of reflected light detected by a light receiving element 110 into a digital value, as shown in FIG. 5. Also, the cutting plotter preferably includes a first calculation means 160 for calculating a digital value of a difference in the amounts of reflected light detected by the light receiving element 110 and converted into the digital value by the A/D converter 150, a storage means 120 for storing therein the digital value of the difference in the amounts of reflected light calculated by the first calculation means, a second calculation means 130 for calculating digital value of a relative difference between the difference in the amounts of reflected light stored in the storage means 120 and the difference in the amounts of reflected light calculated by the first calculation means 160, and a determination means 140 for determining whether or not the digital value of the relative difference calculated by the second calculation means 130 is within a predetermined tolerance, to thereby determine whether or not register marks 30 are printed on a surface of a seal material 10. Further, the cutting plotter of the illustrated embodiment may be preferably constructed in such a manner that the digital value of the relative difference between the difference AO in the amounts of reflected light stored in the storage means 120 and the difference A in the amounts of reflected light calculated by the first calculation means 160 is accurately calculated by the second calculation means 130 without any mistake and/or the determination means 140 accurately determines whether or not the register marks 30 are printed on the surface of the seal material 10 on the basis of the digital value of the relative difference between the differences AO and A calculated by the second calculation means 130.

As can be seen from the foregoing, reading of the register marks for seal cutting printed on corners or the like of the surface of the seal material by the cutting plotter of the present invention prevents any unnecessary colored line or stain which may be possibly printed on or caused on a portion of the seal material in proximity to the register mark from being mistaken for the register mark.

In addition, even when any situation, such as lack of gloss of the surfaces of the register marks, color fading of the register marks, lack of gloss of a portion of the seal material which is defined near the register marks and of which a ground color is exposed, dullness of the portion of the seal material or the like, occurs, reading of the register marks according to the present invention effectively prevents the situation from adversely affecting reading of the register marks, to thereby ensure satisfactory and accurate reading thereof.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A method for reading register marks for seal cutting printed on a surface of a seal material, comprising the steps of:

(a) moving a head in X- and Y-directions relative to the seal material placed on a platen to a position right above a first one of the register marks while emitting a predetermined amount of light toward the surface of the seal material from a light emitting element arranged on the head;

(b) detecting, by a light receiving element arranged on the head, an amount of light which is reflected from a surface of the first register mark when light is emitted from the light emitting element and an amount of light which is reflected from a surface of a portion of the seal material, proximate to the first register mark, when light is emitted from the light emitting element during the moving of the head to the position right above the first register mark;

(c) calculating a first difference between the amounts of reflected light detected by the light receiving element;

(d) storing the first difference in the amounts of reflected light in a storage means;

(e) moving the head in the X- and Y-directions relative to the seal material to a position right above a portion of the seal material, on which a respective one of the remaining register marks is supposed to be printed, while emitting the predetermined amount of light toward the surface of the seal material from the light emitting element;

(f) detecting, by the light receiving element, an amount of reflected light which is emitted from the light emitting element and reflected from the surface of the portion of the seal material on which the respective one of the remaining register marks is supposed to be printed and an amount of reflected light which is emitted from the light emitting element and reflected from a surface of a portion of the seal material, which portion is defined in proximity to the portion of the seal material on which the respective one of the remaining register marks is supposed to be printed, during the moving of the head to the position right above the portion of the seal material on which the respective one of the remaining register marks is supposed to be printed;

(g) calculating a second difference between the amounts of reflected light respectively detected by the light receiving element in the step (f);

(h) calculating a relative difference between the first difference in the amounts of reflected light stored in the storage means and the second difference in the amounts of reflected light calculated in the step (g); and (i) determining whether or not the relative difference is within a predetermined tolerance, to thereby determine whether or not the register mark is printed on the surface of the portion of the seal material on which the respective one of the remaining register marks is supposed to be printed.

2. A method for reading register marks for seal cutting printed on a surface of a seal material as defined in claim 1, further comprising the step of converting the amount of reflected light detected by the light receiving element into a digital value;

wherein said calculating of the first difference includes calculating a digital value of the first difference between the amounts of reflected light respectively detected by the light receiving element;

said storing of the first difference includes storing the digital value of the first difference in the storage means;

said calculating of the second difference includes calculating a digital value of the second difference between the amounts of reflected light respectively detected by the light receiving element;

said calculating of the relative difference includes calculating a digital value of the relative difference between the first and second differences; and said determining includes determining whether or not the digital value of the relative difference is within a predetermined tolerance, to thereby determine whether or not the register marks are printed on the surface of the seal material.

3. A method for reading register marks for seal cutting printed on a surface of a seal material as defined in claim 1, wherein said moving of the head relative to the seal material includes moving the head in the X-direction above the seal material and moving the seal material in the Y-direction on the platen.

4. A method for reading register marks for seal cutting printed on a surface of a seal material as defined in claim 2, wherein said moving of the head relative to the seal material includes moving the head in the X-direction above the seal material and moving the seal material in the Y-direction on the platen.

5. A method for reading register marks for seal cutting printed on a surface of a seal material, comprising the steps of:

(a) moving a head member relative to the seal material placed on a platen to a position adjacent a first one of the register marks while emitting a predetermined amount of light toward the surface of the seal material from a light emitting element arranged on the head;

(b) detecting a first amount of light which is reflected from a surface of the first register mark when light is emitted from the light emitting element and a second amount of light which is reflected from a surface of a portion of the seal material, proximate to the first register mark, when light is emitted from the light emitting element during the moving of the head to the position adjacent the first register mark;

(c) calculating a first difference between the first and second amounts of reflected light detected by the light receiving element;

(d) storing the first difference of the first and second amounts of reflected light;

(e) moving the head relative to the seal material to a position above a portion of the seal material, on which a respective one of the remaining register marks is supposed to be printed, while emitting the predetermined amount of light toward the surface of the seal material from the light emitting element;

(f) detecting, by the light receiving element, a third amount of reflected light which is emitted from the light emitting element and reflected from the surface of the portion of the seal material on which the respective one of the remaining register marks is supposed to be printed and a fourth amount of reflected light which is emitted from the light emitting element and reflected from a surface of a portion of the seal material, proximate to the portion of the seal material on which the respective one of the remaining register marks is supposed to be printed, during the moving of the head to the position above the portion of the seal material on which the respective one of the remaining register marks is supposed to be printed;

(g) calculating a second difference between the third and fourth amounts of reflected light respectively detected by the light receiving element in the step (f);

(h) calculating a relative difference between the first difference in the amounts of reflected light stored in the storage means and the second difference in the amounts of reflected light calculated in the step (g); and (i) determining whether or not the relative difference is within a predetermined tolerance, to thereby determine whether or not the register mark is printed on the surface of the portion of the seal material on which the respective one of the remaining register marks is supposed to be printed.

6. A method for reading register marks for seal cutting printed on a surface of seal material as defined in claim 5, further comprising the step of converting the amount of reflected light detected by the light receiving element into a digital value;

wherein said calculating of the first difference includes calculating a digital value of the first difference between the amounts of reflected light respectively detected by the light receiving element;

said storing of the first difference includes storing the digital value of the first difference in a storage means;

said calculating of the second difference includes calculating a digital value of the second difference between the amounts of reflected light respectively detected by the light receiving element;

said calculating of the relative difference includes calculating a digital value of the relative difference between the first and second differences; and said determining includes determining whether or not the digital value of the relative difference is within a predetermined tolerance, to thereby determine whether or not the register marks are printed on the surface of the seal material.

7. A method for reading register marks for seal cutting printed on a surface of a seal material as defined in claim 5, wherein said moving of the head relative to the seal material includes moving the head in a X-direction above the seal material and moving the seal material in a Y-direction on the platen.

8. A method for reading register marks for seal cutting printed on a surface of a seal material as defined in claim 6, wherein said moving of the head relative to the seal material includes moving the head in a X-direction above the seal material and moving the seal material in a Y-direction on the platen.

* * * * *